United States Patent
Yamamoto

(10) Patent No.: US 8,535,837 B2
(45) Date of Patent: Sep. 17, 2013

(54) FUEL CELL SYSTEM

(75) Inventor: Masao Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 289 days.

(21) Appl. No.: 13/143,258

(22) PCT Filed: Dec. 22, 2009

(86) PCT No.: PCT/JP2009/007084
§ 371 (c)(1),
(2), (4) Date: Jul. 5, 2011

(87) PCT Pub. No.: WO2010/079561
PCT Pub. Date: Jul. 15, 2010

(65) Prior Publication Data
US 2011/0269034 A1    Nov. 3, 2011

(30) Foreign Application Priority Data
Jan. 8, 2009    (JP) .................................. 2009-002291

(51) Int. Cl.
*H01M 8/06*    (2006.01)
(52) U.S. Cl.
USPC ........... 429/410; 429/408; 429/414; 429/412; 429/427; 429/434; 429/455; 429/456; 429/462
(58) Field of Classification Search
USPC ......... 429/410, 412, 417, 419–420, 427–428, 429/443, 455–456, 462
See application file for complete search history.

(56) References Cited

U.S. PATENT DOCUMENTS

| 6,432,566 B1* | 8/2002 | Condit et al. ................. 429/415 |
| 2009/0011299 A1 | 1/2009 | Yokoyama |
| 2009/0269653 A1* | 10/2009 | Yajima et al. ................... 429/40 |
| 2010/0104903 A1* | 4/2010 | Gummalla et al. ............. 429/20 |

FOREIGN PATENT DOCUMENTS

| JP | 08-185883 A | 7/1996 |
| JP | 2001-283884 A | 10/2001 |
| JP | 2005-032673 A | 2/2005 |
| JP | 2005-129334 A | 5/2005 |
| JP | 2006-278117 A | 10/2006 |
| JP | 2007-234238 A | 9/2007 |
| JP | 2008-027587 A | 2/2008 |
| JP | 2008-251447 A | 10/2008 |

OTHER PUBLICATIONS

International Search Report for International Application No. PCT/JP2009/007084, dated Apr. 6, 2010, 2 pages.

* cited by examiner

*Primary Examiner* — Patrick Ryan
*Assistant Examiner* — Ben Lewis
(74) *Attorney, Agent, or Firm* — Brinks Hofer Gilson & Lione

(57) ABSTRACT

There are included a gas-liquid separator (14) that performs gas-liquid separation on fuel exhaust gas exhausted from a fuel cell (11), a combustion section (13) that combusts hydrogen in the separated fuel exhaust gas, a heat exchanger (15) that performs heat exchange on combustion exhaust gas generated by the combustion, to condense moisture in the combustion exhaust gas and obtain combustion exhaust gas condensed water, and a degasifier (16) that removes carbon dioxide gas from the combustion exhaust gas condensed water and the fuel exhaust gas condensed water separated in the gas-liquid separator (14), and the degassed condensed water is stored in condensed water tank (18).

7 Claims, 7 Drawing Sheets

FUEL CELL SYSTEM

This application is a 371 application of PCT/JP2009/007084 having an international filing date of Dec. 22, 2009, which claims priority to JP2009-002291 filed on Jan. 8, 2009, the entire contents of which are incorporated herein by reference.

TECHNICAL FIELD

The present invention relates to a fuel cell system.

BACKGROUND ART

A conventional fuel cell system, for example as disclosed in Patent Document 1, collects hydrogen contained in fuel exhaust gas exhausted from a fuel cell and combusts the collected hydrogen. The conventional fuel cell system collects water from combustion exhaust gas exhausted by the combustion, and removes ions from the collected water by means of an ion removal device. The conventional fuel cell system generates hydrogen that is used for power generation of the fuel cell through use of the deionized water from which ions have been removed.

FIG. 7 is a constitutional view showing the conventional fuel cell system described in Patent Document 1. As shown in FIG. 7, fuel cell system 70 is made up of fuel cell 71, fuel gas generator 72, gas-liquid separator 74, heat exchanger 75, degasifier 76, condensed water tank 78, ion removal device 79, and pure water tank 77.

Fuel gas generator 72 generates fuel gas to be supplied to fuel cell 71. Gas-liquid separator 74 condenses moisture contained in fuel exhaust gas exhausted from fuel cell 71, and separates the moisture into fuel exhaust gas condensed water and combustion gas containing hydrogen. Combustion section 73 of fuel gas generator 72 combusts the combustion gas containing hydrogen separated by gas-liquid separator 74. Heat exchanger 75 performs heat exchange to condense combustion exhaust gas exhausted by the combustion in combustion section 73, and generates combustion exhaust gas condensed water.

Degasifier 76 performs degassing treatment on the combustion exhaust gas condensed water condensed in heat exchanger 75 by means of exhaust air exhausted from fuel cell 71. Condensed water tank 78 stores the fuel exhaust gas condensed water condensed in gas-liquid separator 74, and the combustion exhaust gas condensed water degassed by degasifier 76 after condensed in heat exchanger 75. Ion removal device 79 removes ions contained in the condensed water stored in condensed water tank 78. Deionized water from which ions have been removed is stored into pure water tank 77.

However, in the conventional fuel cell system, the fuel exhaust gas condensed water condensed in gas-liquid separator 74 contains a large amount of carbon dioxide gas. The carbon dioxide gas is dissociated as bicarbonate ions in condensed water tank 78. For this reason, the condensed water stored in condensed water tank 78 contains a large amount of bicarbonate ions. This results in an increase in amount of ions to be removed in ion removal device 79. There has thus been a problem in that the durability of ion removal device 79 deteriorates to destabilize the operation of the fuel cell system in a short period of time. Patent Document 1: Unexamined Japanese Patent Publication No. 2005-129334

DISCLOSURE OF THE INVENTION

The present invention solves the foregoing conventional problem, and provides a fuel cell system which reduces a concentration of carbon dioxide gas contained in fuel exhaust gas condensed water, to stabilize an operating state over a long period of time.

The fuel cell system of the present invention has: a condensed water tank for storing condensed water; an ion removal device for removing ions contained in the condensed water to generate deionized water; a fuel gas generator for generating fuel gas mainly composed of hydrogen through use of the deionized water; and an air supply device for supplying air. The present invention further has: a fuel cell for generating power by using the hydrogen contained in the fuel gas and the air supplied from the air supply device; and a gas-liquid separator for performing gas-liquid separation on fuel exhaust gas exhausted from the fuel cell into combustion gas and fuel exhaust gas condensed water. The present invention further has: a combustion section provided in the fuel gas generator, for combusting hydrogen in the combustion gas separated by the gas-liquid separator; and a heat exchanger for exchanging heat of combustion exhaust gas generated by the combustion in the combustion section to condense moisture in the combustion exhaust gas and generating combustion exhaust gas condensed water. The present invention further has a degasifier for producing the condensed water by bringing the fuel exhaust gas condensed water and the combustion exhaust gas condensed water into contact with degassing air and removing carbon dioxide gas contained in the combustion exhaust gas condensed water and the fuel exhaust gas condensed water.

According to such a configuration, the combustion exhaust gas condensed water and the fuel exhaust gas condensed water are subjected to the degassing treatment by the degasifier. Thereby, concentrations of carbon dioxide gas in the combustion exhaust gas condensed water and the fuel exhaust gas condensed water decrease, and a concentration of bicarbonate ions dissociated in the condensed water tank significantly decreases. This results in a decreased amount of ions to be removed in the ion removal device, to improve the durability of the ion removal device and keep the fuel cell system in a stably operating state over a long period of time. Accordingly, the fuel cell system of the present invention is a fuel cell system which reduces the concentration of bicarbonate ions in the condensed water stored in the condensed water tank, thereby improving the durability of the ion removal device and stabilizing an operating state over a long period of time.

DETAILED DESCRIPTION OF THE PREFERRED EMBODIMENTS (Embodiment 1)

Figure 1:
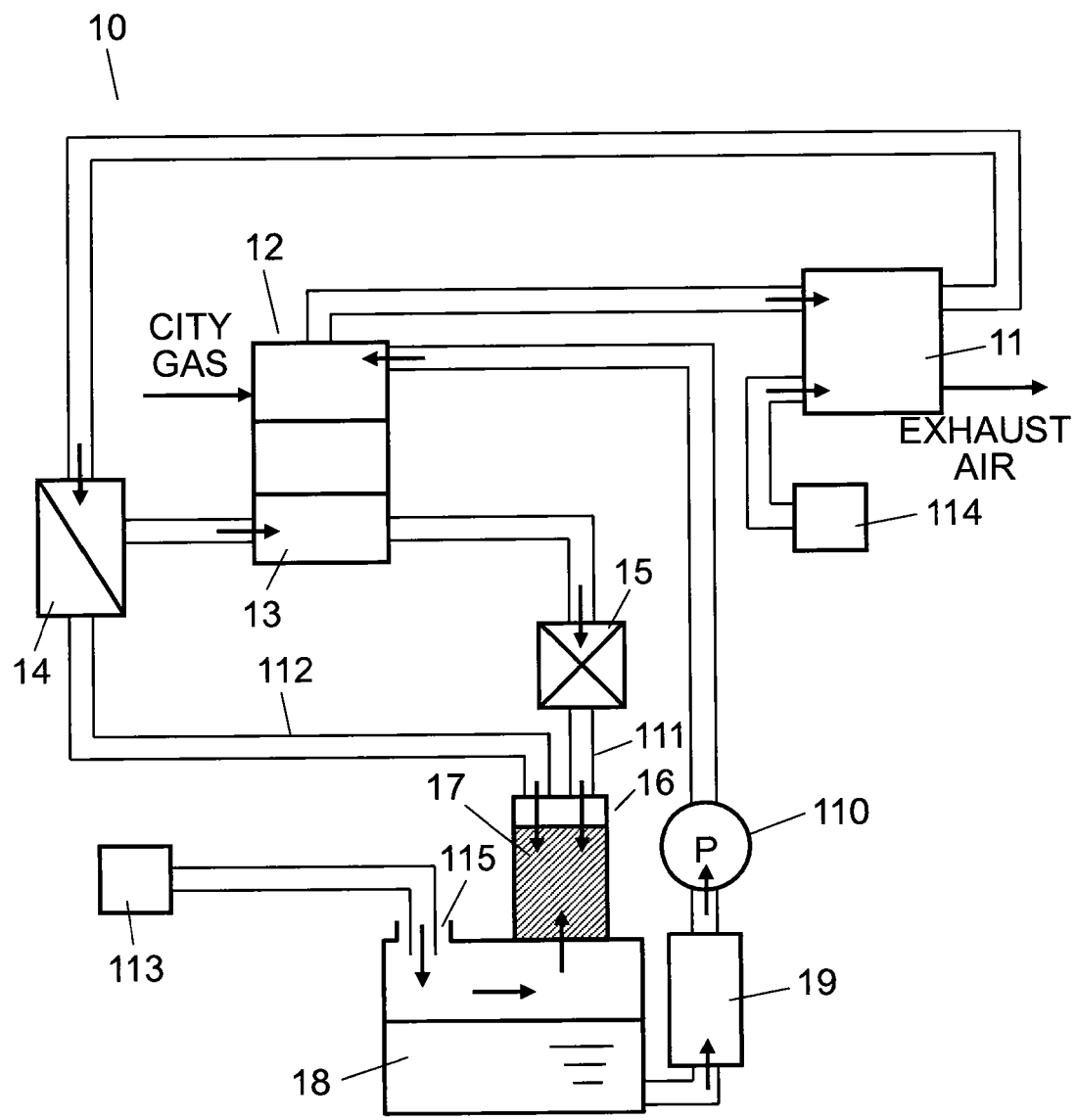
FIG. 1 is a constitutional view showing a fuel cell system according to Embodiment 1 of the present invention.

FIG. 1 is a constitutional view showing a fuel cell system according to Embodiment 1 of the present invention. As shown in FIG. 1, fuel cell system 10 according to the present embodiment has condensed water tank 18, ion removal device 19, water pump 110, fuel gas generator 12, air supply device 114, and fuel cell 11. Condensed water tank 18 stores condensed water. Ion removal device 19 removes ions in the condensed water supplied from condensed water tank 18, to turn the condensed water into deionized water. The deionized water is conveyed to fuel gas generator 12 by water pump 110. Having a supply of the deionized water, fuel gas generator 12 reforms city gas, to generate fuel gas mainly composed of hydrogen. Simultaneously with having a supply of air from air supply device 114, fuel cell 11 has a supply of the fuel gas from fuel gas generator 12. Fuel cell 11 generates power from hydrogen contained in the fuel gas supplied from fuel gas generator 12, and oxygen contained in the air supplied from air supply device 114.

Hereinafter, a material and a function of each constitutional element constituting fuel cell system 10 according to the present embodiment are specifically described. Condensed water tank 18 is, for example, made up of stainless, a resin, or the like, and stores condensed water. In ion removal device 19, the inside of a container, which is for example made up of stainless, a resin, or the like, is filled with an ion exchange resin. The ion exchange resin adsorbs cations and anions in the condensed water, to deionize the condensed water so as to generate deionized water.

Further, in fuel gas generator 12, a container, which is for example made up of stainless or the like, is filled with a catalyst carrying ruthenium on an alumina carrier. Fuel gas generator 12 brings city gas and the deionized water generated by ion removal device 19 into a chemical reaction at about 650° C., to generate hydrogen and carbon dioxide. In this case, the deionized water serves to make the chemical reaction proceed. It should be noted that fuel gas generator 12, for example, has a selective oxidation device or the like which oxidizes carbon monoxide, generated in trace amounts by the chemical reaction, to carbon dioxide. The selective oxidation device is, for example, configured by arranging a catalyst carrying platinum on an alumina carrier on the rear flow side.

Moreover, fuel cell 11 is made up of an aggregate stacked with a plurality of cells each including an anode (not shown) and a cathode (not shown) respectively on both sides of a hydrogen-ion conductive electrolyte membrane (not shown). As the hydrogen ion conductive electrolyte membrane, there is used a polymer obtained by attaching a side chain of a sulfone group to a main chain of carbon fluoride. Further, as the anode and the cathode, there are used ones configured by making platinum particles as a catalyst carried on carbon black. With this configuration, fuel cell 11 brings hydrogen in the fuel gas supplied from fuel gas generator 12 to the anode, and oxygen in the air supplied from air supply device 114 to the cathode into an electrochemical reaction, to generate power.

Further, fuel gas generator 12 is provided with combustion section 13. Combustion section 13 combusts the city gas at an early stage of the operation of fuel cell system 10, and combusts hydrogen in the fuel exhaust gas, having not been used in fuel cell 11 and exhausted, at the time of stable operation. In this manner, combustion section 13 heats the catalyst, filling the inside of fuel gas generator 12, to about 650° C.

In combustion section 13, combustion exhaust gas is generated by the combustion of hydrogen. The combustion exhaust gas is conveyed from combustion section 13 to heat exchanger 15. Moisture contained in the combustion exhaust gas is condensed by heat exchange in heat exchanger 15, to become combustion exhaust gas condensed water, and then stored into condensed water tank 18.

Hereinafter, operating actions of fuel cell system 10 of the present embodiment are described. At the start of the operation, city gas from a gas supply tube (not shown) and air for combustion from a combustion air supply fan (not shown) are supplied to combustion section 13, to start combustion. In combustion section 13, combustion exhaust gas generated by the combustion is conveyed to heat exchanger 15. Moisture contained in the combustion exhaust gas is condensed by heat exchange in heat exchanger 15 to become combustion exhaust gas condensed water, and then stored into condensed water tank 18. Simultaneously, combustion section 13 heats a catalyst, filling the inside of fuel gas generator 12, to about 650° C.

When the catalyst of fuel gas generator 12 is heated to about 650° C., fuel gas generator 12 performs the following operating actions. First, fuel gas generator 12 generates fuel gas mainly composed of hydrogen, for example through a reforming reaction of deionized water supplied from condensed water tank 18 via ion removal device 19 and water pump 110 with city gas supplied from a gas supply tube (not shown). Next, fuel cell 11 generates power through an electrochemical reaction between hydrogen in the supplied fuel gas and oxygen in the air supplied from air supply device 114. Hydrogen in the fuel exhaust gas, having not been used in fuel cell 11 and exhausted, is supplied to combustion section 13 of fuel gas generator 12. Fuel gas generator 12 combusts this hydrogen.

Gas-liquid separator 14 provided between fuel cell 11 and fuel gas generator 12 separates the fuel exhaust gas into combustion gas as a gas component and fuel exhaust gas condensed water as a liquid component. Hydrogen in the fuel exhaust gas is contained in combustion gas, and supplied to combustion section 13 of fuel gas generator 12. In this manner, combustion gas as hydrogen-based reforming gas with a small content of moisture is subjected to combustion in combustion section 13, which is stable combustion without generation of soot or the like.

In the following, a flow of condensed water in fuel cell system 10 of the present embodiment is described. First, combustion exhaust gas condensed water condensed by heat exchanger 15 is conveyed via combustion exhaust gas condensed water channel 111 to degasifier 16 arranged, for example, in a position where the combustion exhaust gas condensed water drops on the side below heat exchanger 15. It is to be noted that combustion exhaust gas condensed water channel 111 is not an essential constitution. For example, there is a configuration where heat exchanger 15 is united with degasifier 16 without use of combustion exhaust gas condensed water channel 111.

Meanwhile, the fuel exhaust gas condensed water separated by gas-liquid separator 14 is conveyed via fuel exhaust gas condensed water channel 112 to degasifier 16 arranged, for example, in a position where the fuel exhaust gas condensed water drops on the side below gas-liquid separator 14. It is to be noted that fuel exhaust gas condensed water channel 112 is not an essential constitution. For example, there is a configuration where gas-liquid separator 14 is united with degasifier 16 without use of fuel exhaust gas condensed water channel 112.

The inside of degasifier 16, filler 17, which is for example made up of a Raschig ring or the like, is filled. Degassing air, having been conveyed from fan 113, is allowed to flow into degasifier 16, for example, from the lower side thereof through air supply port 115 provided in condensed water tank 18. In this case, the combustion exhaust gas condensed water and the fuel exhaust gas condensed water which flow into degasifier 16 from the topside thereof and the degassing air which flows into degasifier 16 from the underside thereof come in contact with each other, as flowing in directions opposed to each other. As a result, the combustion exhaust gas condensed water and the fuel exhaust gas condensed water after removing carbon dioxide gas contained therein are stored into condensed water tank 18 as condensed water. The condensed water stored in condensed water tank 18 is conveyed to ion removal device 19 by water pump 110. The condensed water is subjected to ion removal by ion removal device 19, and then supplied to fuel gas generator 12 as deionized water.

With the above configuration, carbon dioxide gas contained in the combustion exhaust gas condensed water is removed, while carbon dioxide gas contained in the fuel exhaust gas condensed water is also removed. Hence the concentration of bicarbonate ions dissociated in the condensed water stored in condensed water tank 18 significantly decreases. This results in a further decreased amount of ions to be removed in ion removal device 19, to dramatically improve the durability of ion removal device 19.

Hereinafter, an effect is specifically described, taking a property of the condensed water stored in condensed water tank 18 as a reference. The property of the condensed water stored in condensed water tank 18 after 24-hour continuous operation of fuel cell system 10 of the present embodiment was evaluated from an electric conductivity and the concentration of bicarbonate ions. As a result, the electric conductivity was 5 μS/cm and the bicarbonate ion concentration was 3.1 mg/L. Meanwhile, for the sake of comparison, a similar evaluation was performed on the conventional fuel cell system where only the combustion exhaust gas condensed water is subjected to the degassing treatment, and the fuel exhaust gas condensed water is directly stored into condensed water tank 18 without being subjected to the degassing treatment. As a result, the electric conductivity was 10 μS/cm and the bicarbonate ion concentration was 12.4 mg/L.

That is, the condensed water of fuel cell system 10 of the present embodiment has a one-half electric conductivity and a one-quarter bicarbonate ion amount as compared with those of the condensed water of the conventional fuel cell system. It is seen from this result that, according to the present embodiment, the decrease in amount of bicarbonate ions leads to improvement in durability of ion removal device 19 about fourfold. Therefore, fuel cell system 10 is stably operated over a long period of time.

(Embodiment 2)

Figure 2:
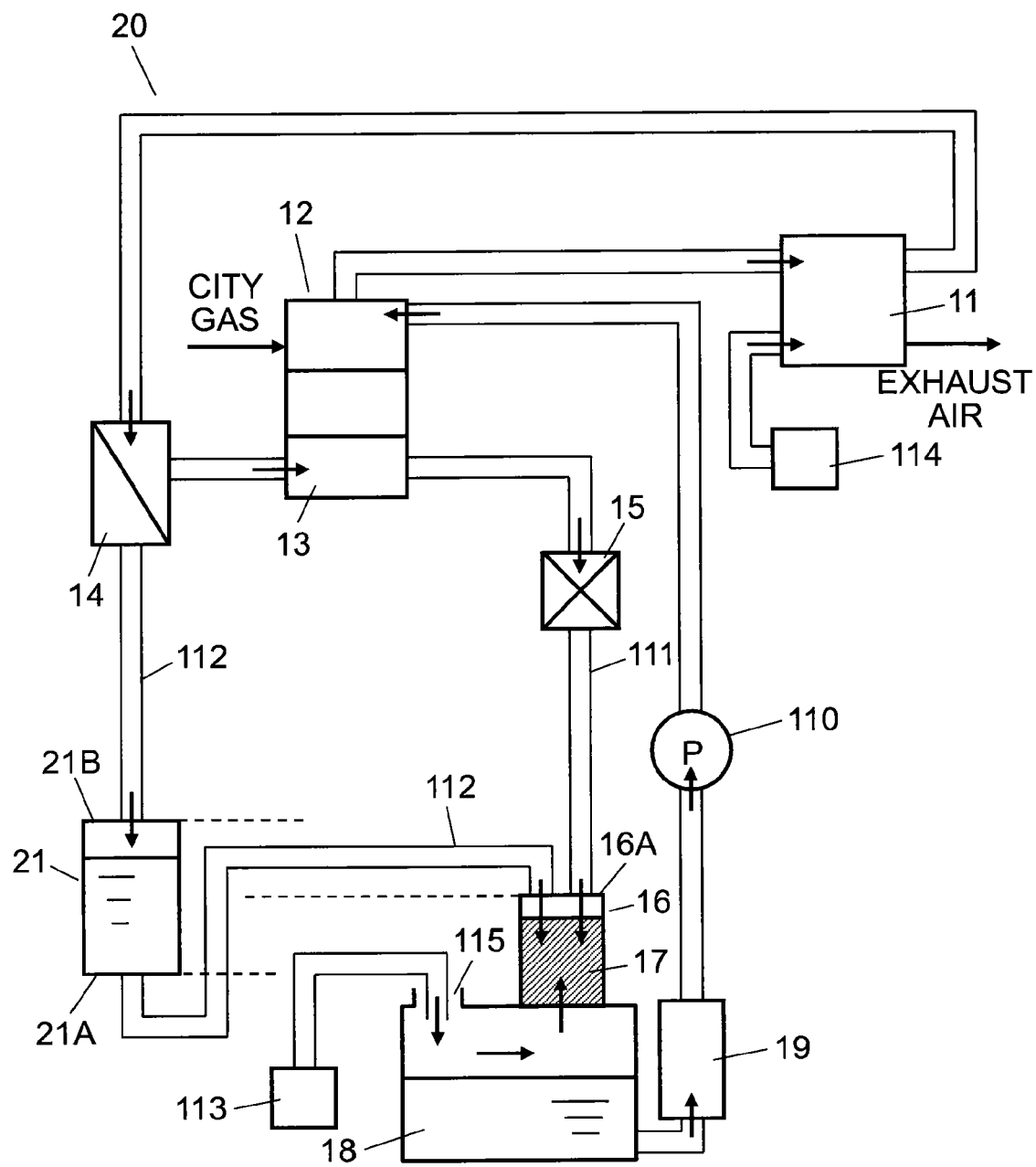
FIG. 2 is a constitutional view showing a fuel cell system according to Embodiment 2 of the present invention.

Hereinafter, a fuel cell system according to Embodiment 2 of the present invention is described with reference to the drawings. FIG. 2 is a constitutional view showing the fuel cell system according to Embodiment 2 of the present invention. It should be noted that in FIG. 2, the same reference numerals are used to describe the same constitutional elements as those in FIG. 1. As shown in FIG. 2, fuel cell system 20 of the present embodiment is different from Embodiment 1 in providing buffer tank 21 in fuel exhaust gas condensed water channel 112 that communicates gas-liquid separator 14 with degasifier 16.

Buffer tank 21 is, for example, made up of stainless, a resin or the like, and is connected to gas-liquid separator 14 and degasifier 16 via fuel exhaust gas condensed water channel 112. Buffer tank 21 stores the fuel exhaust gas condensed water separated from the combustion exhaust gas by gas-liquid separator 14.

In this case, a position (height) of bottom surface 21A of buffer tank 21 is arranged so as to be located below a position (height) of top surface 16A of degasifier 16. Further, a position (height) of top surface 21B of buffer tank 21 is arranged so as to be located above the position (height) of top surface 16A of degasifier 16.

With this configuration, buffer tank 21 constantly stores a fixed amount of fuel exhaust gas condensed water. Thereby, buffer tank 21 water-seals the degassing air which back-flows along fuel exhaust gas condensed water channel 112 from degasifier 16 and the fuel exhaust gas which has failed to be separated from gas-liquid separator 14 and flows along fuel exhaust gas condensed water channel 112. This results in prevention of occurrence of a reaction due to contact between the fuel exhaust gas and the degassing air. Therefore, fuel cell system 20 is stably and safely operated over a long period of time.

Furthermore, as in Embodiment 1, carbon dioxide gas contained in the combustion exhaust gas condensed water is removed, while carbon dioxide gas contained in the fuel exhaust gas condensed water is also removed. Hence the concentration of bicarbonate ions dissociated in the condensed water stored in condensed water tank 18 significantly decreases. This results in a further decreased amount of ions to be removed in ion removal device 19, to dramatically improve the durability of ion removal device 19.

Hereinafter, an effect is specifically described, taking a property of the condensed water stored in condensed water tank 18 as a reference. The property of the condensed water stored in condensed water tank 18 after 24-hour continuous operation of fuel cell system 20 of the present embodiment was evaluated from an electric conductivity and the concentration of bicarbonate ions. As a result, the electric conductivity was 5 μS/cm and the bicarbonate ion concentration was 3.1 mg/L. Meanwhile, for the sake of comparison, a similar evaluation was performed on the conventional fuel cell system where only the combustion exhaust gas condensed water is subjected to the degassing treatment, and the fuel exhaust gas condensed water is directly stored into condensed water tank 18 without being subjected to the degassing treatment. As a result, the electric conductivity was 10 μS/cm and the bicarbonate ion concentration was 12.4 mg/L.

That is, the condensed water of fuel cell system 20 of the present embodiment has a one-half electric conductivity and a one-quarter bicarbonate ion amount as compared with those of the condensed water of the conventional fuel cell system. It is seen from this result that, according to the present embodiment, the decrease in bicarbonate ion amount leads to improvement in durability of ion removal device 19 about fourfold. Therefore, fuel cell system 20 is stably operated over a long period of time.

(Embodiment 3)

Figure 3A:
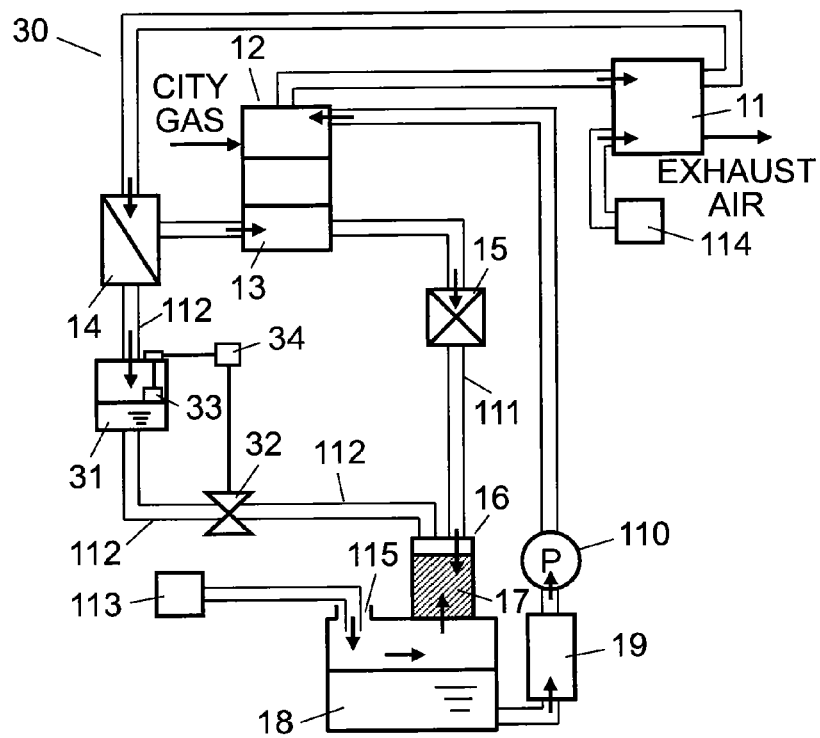
FIG. 3A is a constitutional view of a fuel cell system according to Embodiment 3 of the present invention.
Figure 3B:
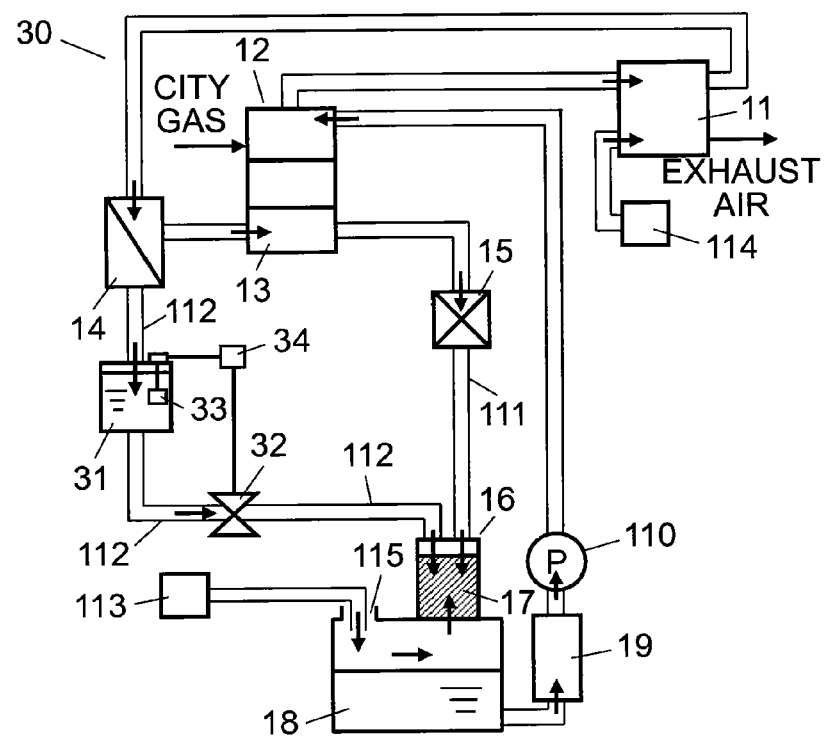
FIG. 3B is a constitutional view showing another state of the fuel cell system in Embodiment 3.

Hereinafter, a fuel cell system according to Embodiment 3 of the present invention is described with reference to the drawings. FIGS. 3A and 3B are constitutional views of the fuel cell system according to Embodiment 3 of the present invention. FIG. 3A shows a state where a water level of the fuel exhaust gas condensed water stored in the buffer tank is lower than a previously set reference water level. FIG. 3B shows a state where the water level of the fuel exhaust gas condensed water stored in the buffer tank is not lower than the previously set reference water level. It should be noted that in FIGS. 3A, 3B, the same reference numerals are used to describe the same constitutional elements as those in FIG. 1. As shown in FIGS. 3A, 3B, fuel cell system 30 of the present embodiment is different from Embodiment 1 in providing, in combustion exhaust gas condensed water channel 112, buffer tank 31 provided with water level sensor 33, cutoff valve 32, and control section 34 that controls opening and closing of cutoff valve 32.

Buffer tank 31 is, for example, made up of stainless, a resin or the like, and is connected to gas-liquid separator 14 and cutoff valve 32 via fuel exhaust gas condensed water channel 112. Further, cutoff valve 32 is connected to degasifier 16. Water level sensor 33 detects a water level of the fuel exhaust gas condensed water stored in buffer tank 31. Control section 34 controls opening and closing of cutoff valve 32 based on information detected by water level sensor 33. Control of the opening and closing of cutoff valve 32 by control section 34 is described below.

Flows of the fuel exhaust gas condensed water, the fuel exhaust gas and degassing air in fuel exhaust gas condensed water channel 112 of the present embodiment are described with reference to FIGS. 3A and 3B. The fuel exhaust gas condensed water separated in gas-liquid separator 14 is stored into buffer tank 31.

First, as shown in FIG. 3A, when water level sensor 33 detects that the water level of the fuel exhaust gas condensed water stored in buffer tank 31 is lower than the previously set reference water level, control section 34 closes off cutoff valve 32. Thereby, fuel exhaust gas condensed water channel 112 between buffer tank 31 and degasifier 16 is cut off by cutoff valve 32. That is, the flow of the degassing air which back-flows along fuel exhaust gas condensed water channel 112 from degasifier 16 and the flow of the fuel exhaust gas which has failed to be separated from gas-liquid separator 14 and flows along fuel exhaust gas condensed water channel 112 are cut off by cutoff valve 32.

On the other hand, as shown in FIG. 3B, when water level sensor 33 detects that the water level of the fuel exhaust gas condensed water stored in buffer tank 31 is not lower than the previously set reference water level, control section 34 opens cutoff valve 32. Thereby, the fuel exhaust gas condensed water drops from buffer tank 31 into degasifier 16. The fuel exhaust gas condensed water is subjected to the degassing treatment by degasifier 16, and then stored into condensed water tank 18. That is, the degassing air which back-flows via degasifier 16 and the fuel exhaust gas which has failed to be separated from gas-liquid separator 14 and flows along fuel exhaust gas condensed water channel 112 are water-sealed by the fuel exhaust gas condensed water stored in buffer tank 31.

Herein, the reference water level described above is, for example, on the order of 10 cm in the case of a buffer tank of an ordinary floor-mounted fuel cell system for domestic use. In addition, this reference water level is not restricted to the above water level. The reference water level is, for example, set to a water level where the water-sealing is held in buffer tank 31 in accordance with pressure of the degassing air which is conveyed from fan 113 and pressure of the fuel exhaust gas which has failed to be separated in gas-liquid separator 14 and leaks.

With the above configuration, it is possible to cut off a back-flow of the degassing air to fuel exhaust gas condensed water channel 112 via degasifier 16. Further, it is possible to cut off a flow of the fuel exhaust gas, which has failed to be separated in gas-liquid separator 14, into degasifier 16. This results in prevention of occurrence of a reaction due to contact between the fuel exhaust gas and the degassing air. Therefore, the safety of fuel cell system 30 is ensured.

Furthermore, as in Embodiment 1, carbon dioxide gas contained in the combustion exhaust gas condensed water is removed, while carbon dioxide gas contained in the fuel exhaust gas condensed water is also removed. Hence the concentration of bicarbonate ions dissociated in the condensed water stored in condensed water tank 18 significantly decreases. This results in a further decreased amount of ions to be removed in ion removal device 19, to dramatically improve the durability of ion removal device 19.

Hereinafter, an effect is specifically described, taking a property of the condensed water stored in condensed water tank 18 as a reference. First, the property of the condensed water stored in condensed water tank 18 after 24-hour continuous operation of fuel cell system 30 of the present embodiment was evaluated from an electric conductivity and the concentration of bicarbonate ions. As a result, the electric conductivity was 5 $\mu$S/cm and the bicarbonate ion concentration was 3.1 mg/L. Meanwhile, for the sake of comparison, a similar evaluation was performed on the conventional fuel cell system where only the combustion exhaust gas condensed water is subjected to the degassing treatment, and the fuel exhaust gas condensed water is directly stored into condensed water tank 18 without being subjected to the degassing treatment. As a result, the electric conductivity was 10 $\mu$S/cm and the bicarbonate ion concentration was 12.4 mg/L.

That is, the condensed water of fuel cell system 30 of the present embodiment has a one-half electric conductivity and a one-quarter bicarbonate ion amount as compared with those of the condensed water of the conventional fuel cell system. It is seen from this result that, according to the present embodiment, the decrease in bicarbonate ion amount leads to improvement in durability of ion removal device 19 about fourfold. Therefore, fuel cell system 30 is stably operated over a long period of time.

(Embodiment 4)

Figure 4:
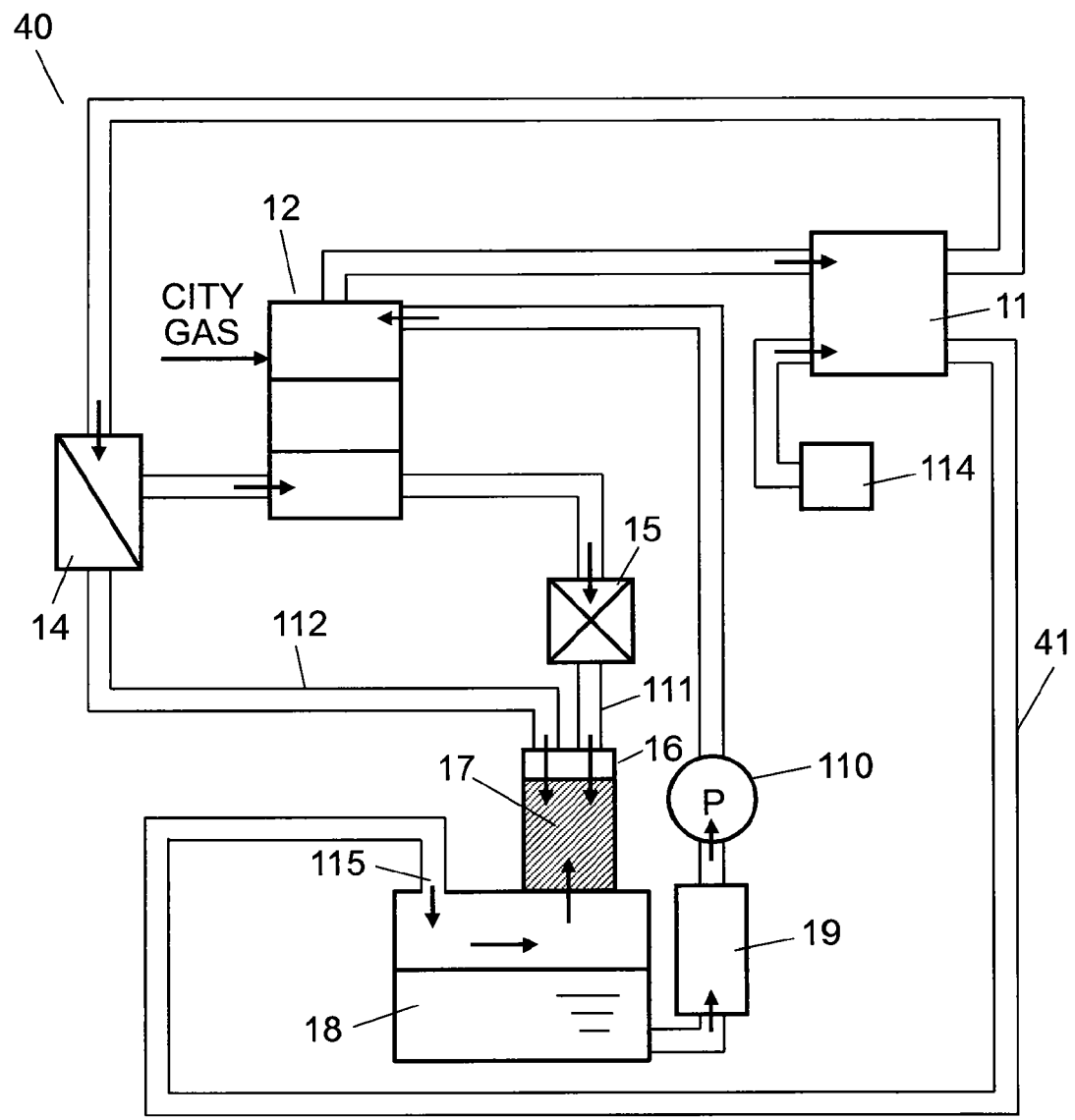
FIG. 4 is a constitutional view showing a fuel cell system according to Embodiment 4 of the present invention.

Hereinafter, a fuel cell system according to Embodiment 4 of the present invention is described with reference to the drawings. FIG. 4 is a constitutional view showing the fuel cell system according to Embodiment 4 of the present invention. It should be noted that in FIG. 4, the same reference numerals are used to describe the same constitutional elements as those in FIG. 1. As shown in FIG. 4, fuel cell system 40 of the present embodiment is different from Embodiment 1 in using exhaust air from fuel cell 11 instead of obtaining degassing air to be supplied to degasifier 16 from fan 113 shown in FIG. 1.

Specifically, the exhaust air exhausted from fuel cell 11 is conveyed to air supply port 115 of condensed water tank 18 via exhaust air channel 41, and further allowed to flow through degasifier 16 as the degassing air. It is to be noted that the exhaust air is preferably allowed to flow from the lower portion to the upper portion of degasifier 16 with fuel cell system 40 being in a standing state. This brings carbon dioxide gas and the degassing air into oppositely contact with each other, to make the contact time longer so as to improve the efficiency of the degassing treatment.

With this configuration, the exhaust air heated by power generation of fuel cell 11 can be used for the degassing treatment. In this case, since the efficiency in reaction of the heated exhaust gas with carbon dioxide gas has been improved, the efficiency in degassing treatment improves. That is, the concentrations of bicarbonate ions in the fuel exhaust gas condensed water and the combustion exhaust gas condensed water are further reduced. Moreover, without the use of fan 113, it is possible to realize simplification and size reduction of fuel cell system 40.

Furthermore, as in Embodiment 1, carbon dioxide gas contained in the combustion exhaust gas condensed water is removed, while carbon dioxide gas contained in the fuel exhaust gas condensed water is also removed. Hence the concentration of bicarbonate ions dissociated in the condensed water stored in condensed water tank 18 significantly decreases. This results in a further decreased amount of ions to be removed in ion removal device 19, to dramatically improve the durability of ion removal device 19.

Hereinafter, an effect is specifically described, taking a property of the condensed water stored in condensed water tank 18 as a reference. First, the property of the condensed water stored in condensed water tank 18 after 24-hour continuous operation of fuel cell system 40 of the present embodiment was evaluated from an electric conductivity and the concentration of bicarbonate ions. As a result, the electric conductivity was 5 μS/cm and the bicarbonate ion concentration was 3.1 mg/L. Meanwhile, for the sake of comparison, a similar evaluation was performed on the conventional fuel cell system where only the combustion exhaust gas condensed water is subjected to the degassing treatment, and the fuel exhaust gas condensed water is directly stored into condensed water tank 18 without being subjected to the degassing treatment. As a result, the electric conductivity was 10 μS/cm and the bicarbonate ion concentration was 12.4 mg/L.

That is, the condensed water of fuel cell system 40 of the present embodiment has a one-half electric conductivity and a one-quarter bicarbonate ion amount as compared with those of the condensed water of the conventional fuel cell system. It is seen from this result that, according to the present embodiment, the decrease in bicarbonate ion amount leads to improvement in durability of ion removal device 19 about fourfold. Therefore, fuel cell system 40 is stably operated over a long period of time.

(Embodiment 5)

Figure 5:
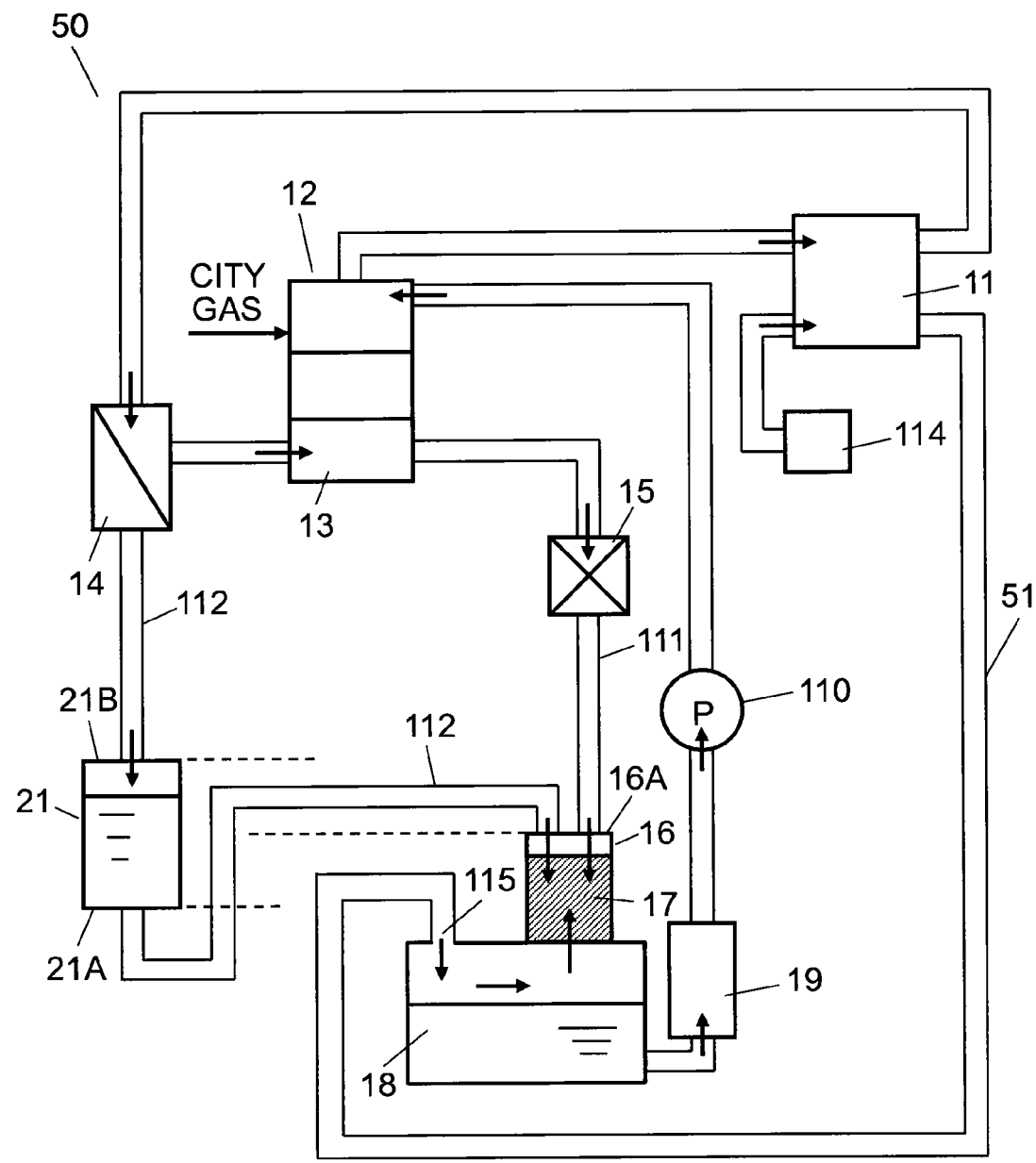
FIG. 5 is a constitutional view showing a fuel cell system according to Embodiment 5 of the present invention.

Hereinafter, a fuel cell system according to Embodiment 5 of the present invention is described with reference to the drawings. FIG. 5 is a constitutional view showing the fuel cell system according to Embodiment 5 of the present invention. It should be noted that in FIG. 5, the same reference numerals are used to describe the same constitutional elements as those in FIG. 2. As shown in FIG. 5, fuel cell system 50 of the present embodiment is different from Embodiment 2 in using exhaust air from fuel cell 11 instead of obtaining degassing air to be supplied to degasifier 16 from fan 113 shown in FIG. 2.

Specifically, the exhaust air exhausted from fuel cell 11 is conveyed to air supply port 115 of condensed water tank 18 via exhaust air channel 51, and further allowed to flow through degasifier 16 as the degassing air. It is to be noted that the exhaust air is preferably allowed to flow from the lower portion to the upper portion of degasifier 16 with fuel cell system 50 being in a standing state. This brings carbon dioxide gas and the degassing air into oppositely contact with each other, to make the contact time longer so as to improve the efficiency of the degassing treatment.

With this configuration, the exhaust air heated by power generation of fuel cell 11 can be used for the degassing treatment. In this case, since the efficiency in reaction of the heated exhaust gas with carbon dioxide gas has been improved, the efficiency in degassing treatment improves. That is, the concentrations of bicarbonate ions in the fuel exhaust gas condensed water and the combustion exhaust gas condensed water are further reduced. Moreover, without the use of fan 113, it is possible to realize simplification and size reduction of fuel cell system 50.

Furthermore, as in Embodiment 2, buffer tank 21 water-seals degassing air which back-flows along fuel exhaust gas condensed water channel 112 from degasifier 16 and fuel exhaust gas which has failed to be separated from gas-liquid separator 14 and flows along fuel exhaust gas condensed water channel 112. This results in prevention of occurrence of a reaction due to contact between the fuel exhaust gas and the degassing air. Therefore, fuel cell system 50 is stably and safely operated over a long period of time.

Further, as in Embodiment 2, carbon dioxide gas contained in the combustion exhaust gas condensed water is removed, while carbon dioxide gas contained in the fuel exhaust gas condensed water is also removed. Hence the concentration of bicarbonate ions dissociated in the condensed water stored in condensed water tank 18 significantly decreases. This results in a further decreased amount of ions to be removed in ion removal device 19, to dramatically improve the durability of ion removal device 19.

Hereinafter, an effect is specifically described, taking a property of the condensed water stored in condensed water tank 18 as a reference. First, the property of the condensed water stored in condensed water tank 18 after 24-hour continuous operation of fuel cell system 50 of the present embodiment was evaluated from an electric conductivity and the concentration of bicarbonate ions. As a result, the electric conductivity was 5 μS/cm and the bicarbonate ion concentration was 3.1 mg/L. Meanwhile, for the sake of comparison, a similar evaluation was performed on the conventional fuel cell system where only the combustion exhaust gas condensed water is subjected to the degassing treatment, and the fuel exhaust gas condensed water is directly stored into condensed water tank 18 without being subjected to the degassing treatment. As a result, the electric conductivity was 10 μS/cm and the bicarbonate ion concentration was 12.4 mg/L.

That is, the condensed water of fuel cell system 50 of the present embodiment has a one-half electric conductivity and a one-quarter bicarbonate ion amount as compared with those of the condensed water of the conventional fuel cell system. It is seen from this result that, according to the present embodiment, the decrease in bicarbonate ion amount leads to improvement in durability of ion removal device 19 about fourfold. Therefore, fuel cell system 50 is stably operated over a long period of time.

(Embodiment 6)

Figure 6A:
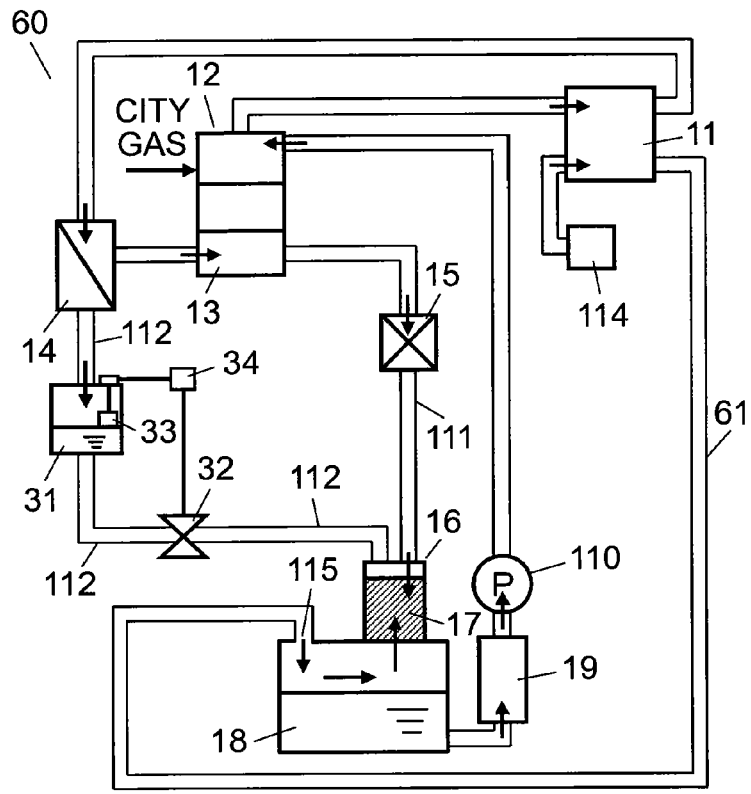
FIG. 6A is a constitutional view of a fuel cell system according to Embodiment 6 of the present invention.
Figure 6B:
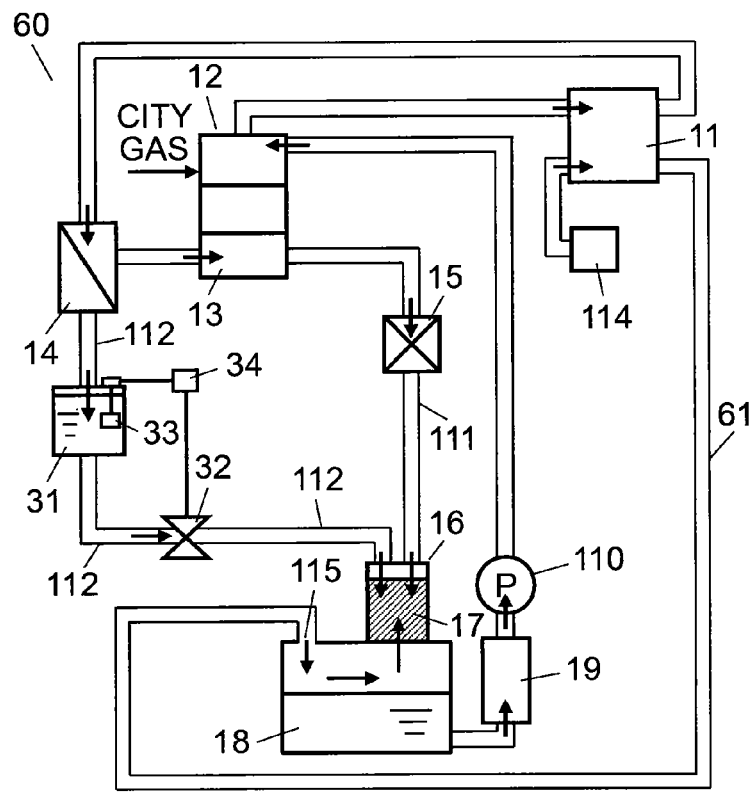
FIG. 6B is a constitutional view showing another state of the fuel cell system in Embodiment 6.
Figure 7:
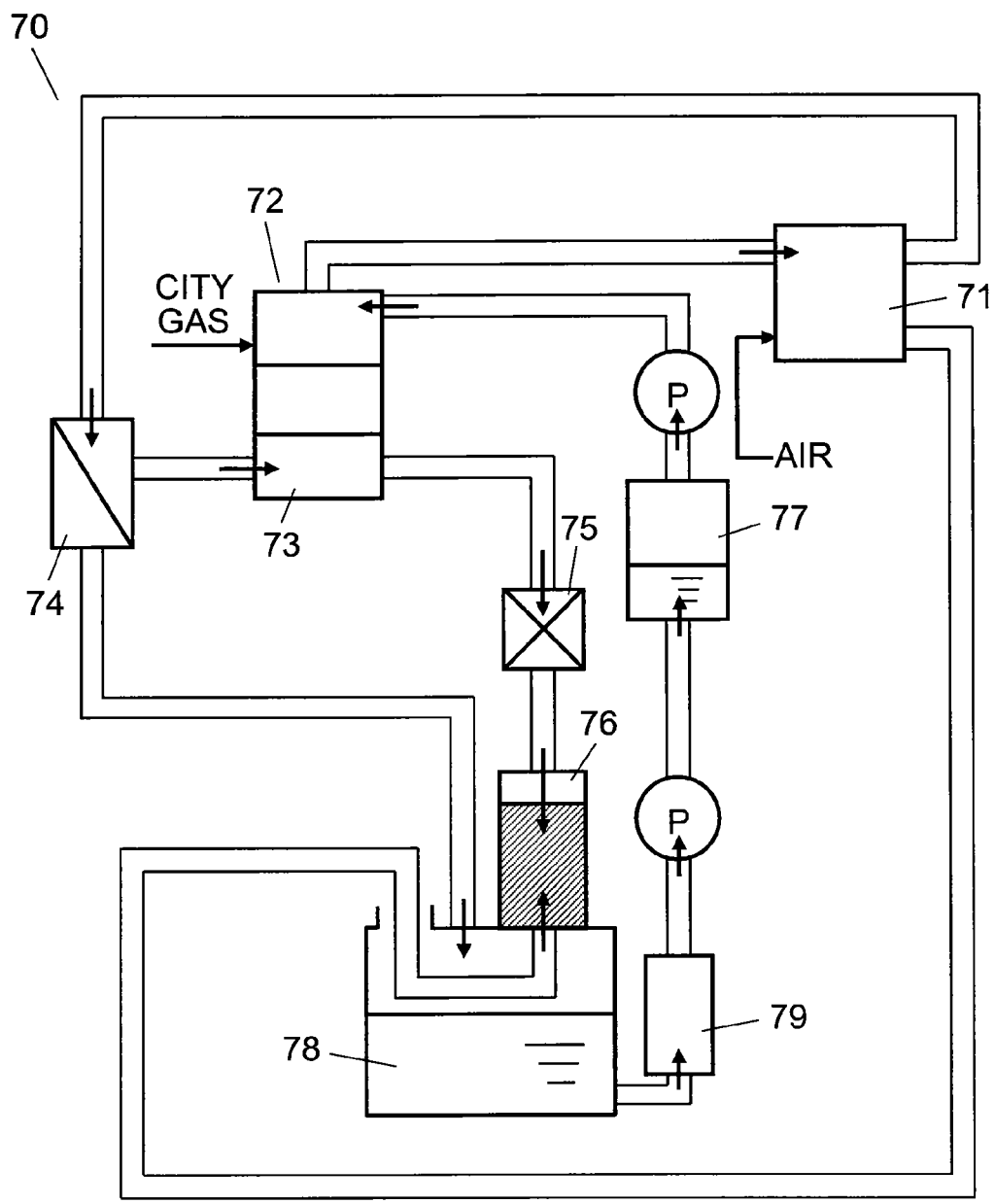
FIG. 7 is a constitutional view showing a conventional fuel cell system.

Hereinafter, a fuel cell system according to Embodiment 6 of the present invention is described with reference to the drawings. FIGS. 6A and 6B are constitutional views of the fuel cell system according to Embodiment 6 of the present invention. FIG. 6A shows a state where a water level of the fuel exhaust gas condensed water stored in a buffer tank is lower than a previously set reference water level. FIG. 6B shows a state where the water level of the fuel exhaust gas condensed water stored in the buffer tank is not lower than the previously set reference water level. It should be noted that in FIGS. 6A, 6B, the same reference numerals are used to describe the same constitutional elements as those in FIGS. 3A, 3B. As shown in FIGS. 6A, 6B, fuel cell system 60 of the present embodiment is different from Embodiment 3 in using exhaust air from fuel cell 11 instead of obtaining degassing air to be supplied to degasifier 16 from fan 113 shown in FIGS. 3A, 3B. It should be noted that other configurations and functions are similar to Embodiment 3.

Specifically, the exhaust air exhausted from fuel cell 11 is conveyed to air supply port 115 of condensed water tank 18 via exhaust air channel 61, and further allowed to flow through degasifier 16 as the degassing air. It is to be noted that exhaust air is preferably allowed to flow from the lower portion to the upper portion of degasifier 16 with fuel cell system 60 being in a standing state. This brings carbon dioxide gas and the degassing air into oppositely contact with each other, to make the contact time longer so as to improve the efficiency of the degassing treatment.

With this configuration, the exhaust air heated by power generation of fuel cell 11 can be used for the degassing treatment. In this case, since the efficiency in reaction of the heated exhaust gas with carbon dioxide gas has been improved, the efficiency in degassing treatment improves. That is, the concentrations of bicarbonate ions in the fuel exhaust gas condensed water and the combustion exhaust gas condensed water are further reduced. Moreover, without the use of fan 113, it is possible to realize simplification and size reduction of fuel cell system 60.

Further, cutoff valve 32 or water-sealing of fuel exhaust gas condensed water can cut off a back-flow of exhaust air to be used for degassing treatment to fuel exhaust gas condensed water channel 112 via degasifier 16, as in Embodiment 3. Moreover, it is possible to reliably cut off a flow of fuel exhaust gas, which has failed to be separated in gas-liquid separator 14, into degasifier 16. This results in prevention of occurrence of a reaction due to contact between the fuel exhaust gas and the degassing air. Therefore, the safety of fuel cell system 60 is ensured.

Further, as in Embodiment 3, carbon dioxide gas contained in the combustion exhaust gas condensed water is removed, while carbon dioxide gas contained in the fuel exhaust gas condensed water is also removed. Hence the concentration of bicarbonate ions dissociated in the condensed water stored in condensed water tank 18 significantly decreases. This results in a further decreased amount of ions to be removed in ion removal device 19, to dramatically improve the durability of ion removal device 19.

Hereinafter, an effect is specifically described, taking a property of the condensed water stored in condensed water tank 18 as a reference. First, the property of the condensed water stored in condensed water tank 18 after 24-hour continuous operation of fuel cell system 60 of the present embodiment was evaluated from an electric conductivity and the concentration of bicarbonate ions. As a result, the electric conductivity was 5 μS/cm and the bicarbonate ion concentration was 3.1 mg/L. Meanwhile, for the sake of comparison, a similar evaluation was performed on the conventional fuel cell system where only the combustion exhaust gas condensed water is subjected to the degassing treatment, and the fuel exhaust gas condensed water is directly stored into condensed water tank 18 without being subjected to the degassing treatment. As a result, the electric conductivity was 10 μS/cm and the bicarbonate ion concentration was 12.4 mg/L.

That is, the condensed water of fuel cell system 60 of the present embodiment has a one-half electric conductivity and a one-quarter bicarbonate ion amount as compared with those of the condensed water of the conventional fuel cell system. It is seen from this result that, according to the present embodiment, the decrease in bicarbonate ion amount leads to improvement in durability of ion removal device 19 about fourfold. Therefore, fuel cell system 60 is stably operated over a long period of time.

It is to be noted that, although the examples have been described in Embodiments 4 to 6 where fuel cell 11 is connected with air supply port 115 of condensed water tank 18 through exhaust air channel 41, 51 or 61, those are not restrictive. For example, there is a configuration where a heat exchanger (not shown) is provided in exhaust air channel 41, 51 or 61 for the exhaust air that is exhausted from fuel cell 11. According to this configuration, moisture contained in the exhaust air is condensed by the heat exchanger (not shown), to become exhaust air condensed water. This exhaust air condensed water is collected, and stored into condensed water tank 18 via an exhaust air condensed water channel (not shown). In this case, the exhaust air condensed water hardly contains carbon dioxide gas. Hence it has no influence on durability of ion removal device 19. It is thereby possible to prevent the lack of condensed water stored in condensed water tank 18. Therefore, fuel cell system 60 is stably operated.

Hereinafter, the reason for this is described, taking fuel cell system 60 shown in Embodiment 6 as an example. When the condensed water stored in condensed water tank 18 runs out, fuel cell system 60 becomes unable to control a temperature of fuel cell 11 and a reforming reaction of fuel gas generator 12. In this case, for example, tap water or the like is typically compensated in condensed water tank 18 from the outside of fuel cell system 60. However, in many cases, the tap water contains a large amount of ion components as compared with the condensed water collected in fuel cell system 60. This causes significant deterioration in durability (life) of ion removal device 19. Consequently, fuel cell system 60 becomes unable to perform stable operation over a long period of time. Threat, even in the case of the lack of the fuel exhaust gas condensed water or the combustion exhaust gas condensed water, the exhaust air condensed water with a small amount of ion components is corrected from the exhaust air, so that fuel cell system 60 is stably operated. It should be noted that this configuration can also be implemented in the configurations of Embodiments 4, 5 as well, and similar effects are exerted.

Further, although the description has been made in each of the embodiments by taking as an example the Raschig ring as the filler for use in degasifier 16, this is not restrictive. For example, there can be used a filler such as a Lessing ring, Dixon packing, a Pall ring, a Heli pack, a coil pack, Mcmahon packing, or Sulzer packing.

Further, although the description has been made in each of the embodiments by taking as an example the configuration of allowing the degassing air to flow into degasifier 16 from the lower portion thereof, this is not restrictive. For example, there is a method of allowing the air to flow into degasifier 16 from the upper portion or the side surface thereof. It should be noted that the degassing air in this case is the exhaust air in Embodiments 4 to 6.

Further, although buffer tank 21 or 31 that stores the fuel exhaust gas condensed water separated in gas-liquid separator 14 is configured separately from gas-liquid separator 14 in each of Embodiments 2, 3, 5, 6, this is not restrictive. For example, there is a configuration where buffer tank 21 or 31 is provided in the lower portion of gas-liquid separator 14, integrally with gas-liquid separator 14, and the configuration exerts a similar effect.

It is to be noted that a variety of fuel cells, such as a phosphoric acid fuel cell, a solid oxide fuel cell, a polymer electrolyte fuel cell, and a molten carbonate fuel cell can be applied to fuel cell 11 mounted in fuel cell system 10, 20, 30, 40, 50 or 60 according to each of the embodiments. Especially in a fuel cell with an operating temperature at not higher than 100° C., such as the polymer electrolyte fuel cell, carbon dioxide gas is contained in a large amount in the fuel exhaust gas condensed water, as compared with the other fuel cells. Accordingly, the present invention has a specific effect of being able to efficiently perform the degassing treatment on carbon dioxide gas.

Further, although gas-liquid separator 14 is formed in a dedicated configuration in each of the embodiments, another configuration capable of performing separation into gas and liquid is usable instead of the dedicated configuration. For example, gas-liquid separation can be performed through use of a heat exchanger, a condenser, or the like.

As thus described, the present invention has: a condensed water tank for storing condensed water; an ion removal device for removing ions contained in the condensed water to generate deionized water; a fuel gas generator for generating fuel gas mainly composed of hydrogen through use of the deionized water; and an air supply device for supplying air. The present invention further has: a fuel cell for generating power by using the hydrogen contained in the fuel gas and the air supplied from the air supply device; and a gas-liquid separator for performing gas-liquid separation on fuel exhaust gas exhausted from the fuel cell into combustion gas and fuel exhaust gas condensed water. The present invention further has: a combustion section provided in the fuel gas generator, for combusting hydrogen in the combustion gas separated by the gas-liquid separator; and a heat exchanger for exchanging heat of combustion exhaust gas generated by the combustion in the combustion section, to condense moisture in the combustion exhaust gas and generating combustion exhaust gas condensed water. The present invention further has a degasifier for producing the condensed water and the combustion exhaust gas condensed water and the combustion exhaust gas condensed water into contact with degassing air, and removing carbon dioxide gas contained in the fuel exhaust gas condensed water and the combustion exhaust gas condensed water.

Thereby, the combustion exhaust gas condensed water and the fuel exhaust gas condensed water are subjected to degassing treatment by the degasifier. Therefore, the combustion exhaust gas condensed water and the fuel exhaust gas condensed water are collected after reduction in concentration of carbon dioxide gas. This collected condensed water has an extremely low concentration of bicarbonate ions that are dissociated in the condensed water tank. This results in a fuel cell system which reduces an amount of ions to be removed in the ion removal device, to improve the durability of the ion removal device and stabilize an operating state over a long period of time.

The present invention further includes a buffer tank for storing the fuel exhaust gas condensed water separated in the gas-liquid separator. Further, in the present invention, a position of a bottom surface of the buffer tank is arranged below a position of a top surface of the degasifier, and a position of a top surface of the buffer tank is arranged above the position of the top surface of the degasifier.

Thereby, a fixed amount of fuel exhaust gas condensed water is constantly stored in the buffer tank, and fuel exhaust gas, air and the like are water-sealed. That is, it is possible to cut off a back-flow of the degassing air to the fuel exhaust gas condensed water channel, and a flow of the fuel exhaust gas, having failed to be separated in the gas-liquid separator, into the degasifier. This results in prevention of occurrence of a reaction due to contact between the fuel exhaust gas and the degassing air, to give a fuel cell system stably and safely operated over a long period of time.

The present invention further includes: a buffer tank for storing the fuel exhaust gas condensed water separated in the gas-liquid separator, and a cutoff valve provided between the buffer tank and the degasifier, for cutting off a flow of the fuel exhaust gas condensed water. The present invention further includes a water level sensor for detecting a water level of the fuel exhaust gas condensed water stored in the buffer tank, and opening and closing of the cutoff valve are controlled based on information detected by the water level sensor.

Therefore, the degassing treatment is performed on the fuel exhaust gas condensed water in a safer manner. Specifically, when the fuel exhaust gas condensed water with a water level not lower than the reference water level is stored in the buffer tank, the cutoff valve is first opened, and the fuel exhaust gas condensed water is conveyed from the buffer tank to the degasifier. That is, the degassing air which back-flows and the fuel exhaust gas which has failed to be separated in the gas-liquid separator are water-sealed by the fuel exhaust gas condensed water stored in the buffer tank. Further, when an amount of water stored in the buffer tank is lower than the reference water level, the cutoff valve is first closed, and the channel is cut off. That is, the degassing air which back-flows along the channel and the fuel exhaust gas which has failed to be separated in the gas-liquid separator are cut off by the cutoff valve. This results in prevention of occurrence of a reaction due to contact between the fuel exhaust gas and the degassing air, to give a fuel cell system stably and safely operated over a long period of time.

Further, the present invention allows the degassing air into the degasifier in a direction opposed to a direction where the fuel exhaust gas condensed water and the combustion exhaust gas condensed water flow into the degasifier. Thereby, the fuel exhaust gas condensed water and the combustion exhaust gas condensed water which are infused into the degasifier and the degassing air which are supplied into the degasifier are oppositely in contact with each other, to make the contact time longer so as to improve the efficiency of the degassing treatment. Consequently, the concentrations of carbon dioxide gas contained in the fuel exhaust gas condensed water and the combustion exhaust gas condensed water are more efficiently reduced, thereby to further improve the durability of the ion removal device. This thus gives a fuel cell system stably and safely operated over a long period of time.

Further, the present invention supplies the degasifier with exhaust air exhausted from the fuel cell, as the degassing air. This eliminates the need for arrangement of the fan, and allows the fuel cell system to have a simple configuration. Further, since the exhaust air has been heated to a predetermined temperature by fuel cell, the efficiency of the degassing treatment improves.

INDUSTRIAL APPLICABILITY

A fuel cell system of the present invention is capable of reducing a concentration of carbon dioxide gas contained in fuel exhaust gas condensed water obtained by condensing fuel exhaust gas, and thereby the system is usable for a stationary or mobile fuel cell system which is desired to have high reliability and a long life.

The invention claimed is:
1. A fuel cell system comprising:
   a condensed water tank for storing condensed water;
   an ion removal device for removing ions contained in the condensed water to generate deionized water;
   a fuel gas generator for generating fuel gas mainly composed of hydrogen through use of the deionized water;
   an air supply device for supplying air;
   a fuel cell for generating power by using the hydrogen contained in the fuel gas and the air supplied from the air supply device;
   a gas-liquid separator for performing gas-liquid separation on fuel exhaust gas exhausted from the fuel cell into combustion gas and fuel exhaust gas condensed water;
   a combustion section provided in the fuel gas generator, for combusting hydrogen in the combustion gas separated by the gas-liquid separator;
   a heat exchanger for exchanging heat of combustion exhaust gas generated by the combustion in the combus- tion section, to condense moisture in the combustion exhaust gas and generating combustion exhaust gas condensed water;

a degasifier for producing the condensed water by bringing the fuel exhaust gas condensed water and the combustion exhaust gas condensed water into contact with degassing air and removing carbon dioxide gas contained in the fuel exhaust gas condensed water and the combustion exhaust gas condensed water; and a buffer tank provided in a fuel exhaust gas condensed water channel communicating the gas-liquid separator with the degasifier and for storing the fuel exhaust gas condensed water separated by the gas-liquid separator, wherein a position of a bottom surface of the buffer tank is arranged below a position of a top surface of the degasifier and a position of a top surface of the buffer tank is arranged above the position of the top surface of the degasifier, and the degassing air that back-flows from the degasifier to the buffer tank is water-sealed by the fuel exhaust gas condensed water stored in the buffer tank.

2. The fuel cell system according to claim 1, further comprising:

a buffer tank for storing the fuel exhaust gas condensed water separated in the gas-liquid separator;

a cutoff valve provided between the buffer tank and the degasifier, for cutting off a flow of the fuel exhaust gas condensed water; and a water level sensor for detecting a water level of the fuel exhaust gas condensed water stored in the buffer tank, wherein an operation of opening and closing of the cutoff valve is controlled based on information detected by the water level sensor.

3. The fuel cell system according to claim 1, wherein the degassing air is injected into degasifier in a direction opposed to a direction of the fuel exhaust gas condensed water and the combustion exhaust gas condensed water flowing into the degasifier.

4. The fuel cell system according to claim 1, wherein the degassing air supplied to the degasifier comprises exhaust air exhausted from the fuel cell.

5. The fuel cell system according to claim 2, wherein the degassing air is injected into degasifier in a direction opposed to a direction of the fuel exhaust gas condensed water and the combustion exhaust gas condensed water flowing into the degasifier.

6. The fuel cell system according to claim 2, wherein the degassing air supplied to the degasifier comprises exhaust air exhausted from the fuel cell.

7. The fuel cell system according to claim 3, wherein the degassing air supplied to the degasifier comprises exhaust air exhausted from the fuel cell.

* * * * *